United States Patent [19]

Tryon

[11] 3,860,527

[45] Jan. 14, 1975

[54] PROCESS FOR THE SIMULTANEOUS PREPARATION OF METAL SALTS OF AN ALKYL ESTER OF A SULFOALKOXYCARBOXYLIC ACID AND A SULFOALKOXYALKANOL

[75] Inventor: Sager Tryon, Claymont, Del.

[73] Assignee: FMC Corporation, Philadelphia, Pa.

[22] Filed: July 20, 1973

[21] Appl. No.: 380,983

[52] U.S. Cl. ............... 252/182, 260/75 S, 260/470
[51] Int. Cl. .......................................... C07c 143/52
[58] Field of Search ............ 252/182; 260/75 S, 470

[56] References Cited
UNITED STATES PATENTS 3,725,351 4/1973 Harrison et al. .................. 260/75 S
3,779,993 12/1973 Kibler et al. ...................... 260/75 S Primary Examiner—Benjamin R. Padgett
Assistant Examiner—Irwin Gluck

[57] ABSTRACT

A metal salt of an alkyl ester of a sulfoalkoxyaromatic or aliphatic carboxylic acid and a metal salt of a sulfoalkoxyalkanol are simultaneously prepared by reacting an alkyl ester of a hydroxy substituted carboxylic acid and a metal alkylene glycolate in an alkylene glycol reaction medium and then reacting the product with an alkane sultone. These products in the glycol medium are then conveniently reacted with aromatic diesters or polyester precondensates to form cationic dyeable filament-forming copolyesters.

6 Claims, No Drawings

PROCESS FOR THE SIMULTANEOUS PREPARATION OF METAL SALTS OF AN ALKYL ESTER OF A SULFOALKOXYCARBOXYLIC ACID AND A SULFOALKOXYALKANOL

Functional sulfonated compounds are useful as copolymerizable condensation reactants to provide linear, thermoplastic copolyester resins of improved basic dyeability. These functional compounds are generally prepared in water or aprotic solvents, such as toluene, xylene or the like. It would be advantageous if these compounds were prepared in a system which does not require product purification or solvent recovery and in which the functional compounds could be used directly in the formation of copolyester resins. Furthermore, a method having the above described advantages and also providing additional functional sulfonated compounds would be even more desirable.

It is an object of this invention to provide a method of simultaneously preparing a metal salt of an alkyl ester of a sulfoalkoxy organic carboxylic acid and a metal salt of a sulfoalkoxyalkanol.

It is another object of this invention to provide a method of simultaneously preparing a metal salt of an alkyl ester of a sulfoalkoxy organic carboxylic acid and a metal salt of a sulfoalkoxyalkanol which products may then be directly incorporated in a reaction system for the preparation of copolyester resins.

These and other objects are accomplished in accordance with this invention which is a method comprising reacting an alkalimetal $C_2$-$C_4$ alkylene glycolate with a lower alkyl ester of a hydroxy substituted aromatic or aliphatic mono- or di-carboxylic acid in a substantially anhydrous $C_2$-$C_4$ alkylene glycol to form an alkali-metal salt of said lower alkyl ester and then reacting this salt and excess alkali glycolate with a $C_3$-$C_4$ alkane sultone in the same reaction medium to form both the alkali-metal salt of the lower alkyl ester of a sulfoalkoxycarboxylic acid and the alkali-metal salt of a sulfoalkoxyalkanol in the alkylene glycol.

The alkali-metal alkylene glycolate is prepared as an anhydrous product by reaction of a $C_2$-$C_4$ alkylene glycol with sodium, potassium or lithium metals, a sodium, potassium or lithium $C_1$-$C_4$ alkoxide, or with sodium hydroxide, potassium hydroxide or lithium hydroxide by removal of water.

When alkali-metal glycolate in glycol reacts with the lower alkyl ester, the alkali-metal is present partly as the alkali salt of the hydroxy substituted lower alkyl ester, and partly as the alkali-metal glycolate, the proportion being determined by the relative acidities of the two compounds. On addition of an alkane sultone, the addition products of the alkoxides and sultone are formed, the products being substituted alkane alkali-metal sulfonates. Heating and stirring of the reaction mixture may be required to allow the addition to go to completion.

If an excess of alkali-metal glycolate over the amount of hydroxylated organic carboxylate is used, the amount of glycolatesultone addition product can be increased. The proportion in which the addition products are formed is determined by the relative degrees of ionization (or dissociation) of the hydroxyl group of the hydroxylated carboxylic acid lower alkyl ester and the $C_2$-$C_4$ alkylene glycol employed.

The resulting glycol solution, containing both substituted alkane alkali-metal sulfonates, is added to ingredients suitable for the manufacture of filament-forming saturated polyester resin at the appropriate stage to provide copolyester resins having these functional sulfonates as integral portions of the polymer chain. In a transesterification-polycondensation reaction, the sulfonate solution may be introduced at the initial or transesterification stage while in a direct esterification-polycondensation reaction, it is preferred to add the sulfonate-glycol solution to the prepolymer after esterification is essentially complete. Polycondensation is carried out in a conventional manner.

Fibers are prepared from the cationic dyeable resin produced by the method of this invention by melt spinning the resin to form fibers and then drawing the fibers in a conventional manner for either continuous multi-filament yarn or tow for staple fibers.

The $C_2$-$C_4$ alkylene glycols referred to herein for preparation of the sulfonates include those having the general formula $HO$—$(CH_2)_n$—$OH$ wherein $n$ is 2, 3 or 4 but preferably ethylene glycol.

Examples of the hydroxy substituted aromatic mono- and di-carboxylic acids which are useful in the form of their lower alkyl esters for this invention are o-, m-, and p-hydroxybenzoic acids, hydroxyphthalic acid, hydroxyisophthalic acid, hydroxyterephthalic acid, hydroxynaphthoic acid, hydroxybibenzoic acid, dihydroxybibenzoic acid, hydroxynaphthalene dicarboxylic acid, and dihydroxynaphthalene dicarboxylic acid.

The hydroxy substituted aliphatic mono- and di-carboxylic acids which are useful for this invention are limited to the extent that the hydroxyl groups of their lower alkyl esters must dissociate sufficiently in the glycol medium to be competitive with the glycol for the sultone reactant. For the purpose of this invention, the hydroxy substituted aliphatic carboxylic acid must be one in which the hydroxy group has a dissociation constant ($k_a$) in water of $6 \times 10^{-14}$ or greater. Examples of some acids which are useful are: glycolic acid, lactic acid, maleic acid, and 12-hydroxystearic acid.

The above aromatic and aliphatic acids may, of course, be substituted by alkyl, halogen or other non-reactive groups. Additional hydroxyl groups may be substituted, if desired, particularly on the larger aromatic radicals.

The lower alkyl esters are those esters formed with the above acids and lower alkanols or their functional equivalents. For example, methanol, ethanol, n-propanol and n-hexanol are suitably employed to form the esters.

The cationic dyeable copolyester resins are prepared using aromatic dicarboxylic acids or their lower alkyl esters, for example, terephthalic, 2,6-naphthalene dicarboxylic, bibenzoic and isophthalic acid. Other glycols which are useful in the formation of the resin, in addition to those meeting the general formula $HO(CH_2)_mOH$ wherein $m$ is an integer of from 2 to 10, include the aromatic glycols, e.g., 1,4-bis-2-(hydroxyethoxy)benzene; 1,4-cyclohexanedimethanol, gem dialkyl glycols and the like.

The following example is set forth to demonstrate this invention.

EXAMPLE

A 1.5 molal solution of sodium glycolate was prepared by dissolving 80 g. of a 50 percent aqueous solution of NaOH in 600 g. ethylene glycol, and distilling off a mixture of water and glycol at 1 mm. Hg pressure and a charge temperature of 60°C. until all water had been removed. The residue was brought to a total weight of 667 g. by addition of dry glycol, resulting in a 1.5M solution.

66.8 g. of the above solution, equivalent to 0.1 mole sodium glycolate, was placed in a 250 ml. Erlenmeyer flask and to it were added 21 g. (0.1 mole) dimethyl 5-hydroxyisophthalate and 12.2 g. (0.1 mole) gamma-propane sultone. The charge was stirred under dry $N_2$ at 70°C. for 4 hours, at which time 14.7 g. (0.022 mole) sodium glycolate solution and 2.69 g. (0.022 mole) gamma-propane-sultone were added. After 2 hours additional stirring at 70°C., titration showed that 93% of the isophthalate had reacted. The charge therefore contained 0.093 mole 3-(3,5-dicarbomethoxyphenoxy) propane sodium sulfonate and 0.029 mole 3-(2-hydroxyethoxy) propane sodium sulfonate.

150 g. of a prepolymer (equivalent to 0.062 mole dimethyl terephthalate) prepared by ester interchange between dimethyl terephthalate and ethylene glycol by usual procedures, was charged to a stirred reactor and to this was added 11.9 g. of the above prepared sulfonate-glycol solution, corresponding to 1.5 m percent 3-(3,5-dicarbomethoxyphenoxy) propane sodium sulfonate and 0.45 m percent of 3-(2-hydroxyethoxy) propane sodium sulfonate, and 0.048 g. $Sb_2O_3$, a classical condensation catalyst. Condensation was carried out by usual procedures, i.e., by heating and stirring at 280°C. under vacuum (0.05 mm. Hg) for 85 minutes.

The product had an intrinsic viscosity of 0.492, a free carboxyl content of 28 milliequivalents/kg, and a diethylene glycol content of 1.38 wt. percent. It was spun into yarn, having a whiteness index of 947 (max.=1,000), which was knitted and dyed with a blue cationic dye (Sevron Blue). It dyed to a rich blue shade, somewhat deeper than that obtained when dyeing yarn prepared similarly except for the use of 1.5 mole percent of 3-(3,5-dicarbomethoxyphenoxy) propane sodium sulfonate prepared and isolated by usual organic preparation methods.

Various changes and modifications may be made in practicing the invention without departing from the spirit and scope thereof and, therefore, the invention is not to be limited except as defined in the appended claims.

I claim:

1. A method comprising reacting in a substantially anhydrous $C_2$-$C_4$ alkylene glycol an alkali-metal $C_2$-$C_4$ alkylene glycolate with a lower alkyl ester of a hydroxy substituted aromatic mono- or dicarboxylic acid or a lower alkyl ester of a hydroxy substituted aliphatic mono- or dicarboxylic acid having a dissociation constant in water of $6 \times 10^{-14}$ or greater to form an alkali-metal salt of said lower alkyl ester and then reacting this salt and the remaining alkali-metal glycolate with a $C_3$-$C_4$ alkane sultone in the same reaction medium to form both the alkali-metal salt of the lower alkyl ester of a sulfoalkoxy aromatic or aliphatic carboxylic acid and the alkali metal salt of a sulfoalkoxy alkanol.

2. The method of claim 1 wherein the lower alkyl ester is of a hydroxy substituted aromatic dicarboxylic acid.

3. The method of claim 1 wherein the lower alkyl ester is of a hydroxy substituted aromatic monocarboxylic acid.

4. The method of claim 1 wherein the alkali-metal alkylene glycolate is alkali-metal ethylene glycolate and the alkylene glycol is ethylene glycol.

5. The method of claim 1 wherein the $C_3$-$C_4$ alkane sultone is propane sultone.

6. The method of claim 1 wherein the alkali-metal alkylene glycolate is alkali-metal ethylene glycolate, the alkylene glycol is ethylene glycol, the lower alkyl ester is the lower alkyl ester of hydroxyisophthalic acid and the alkane sultone is propane sultone.

* * * * *

UNITED STATES PATENT OFFICE
CERTIFICATE OF CORRECTION

Patent No. 3,860,527      Dated January 14, 1975

Inventor(s) Sager Tryon

It is certified that error appears in the above-identified patent and that said Letters Patent are hereby corrected as shown below:

Col. 2, line 34, "purpose" should read --purposes--.
Col. 3, line 18, "0.062" should read --0.62--.

Signed and sealed this 22nd day of April 1975.

(SEAL)
Attest:

RUTH C. MASON
Attesting Officer

C. MARSHALL DANN
Commissioner of Patents
and Trademarks